United States Patent [19]

Kumar et al.

[11] Patent Number: 5,484,989
[45] Date of Patent: Jan. 16, 1996

[54] CARD READING TERMINAL HAVING PROTECTIVE SHIELD FOR INPUT PORT THEREOF

[75] Inventors: Rajendra Kumar, Akron; Steven E. Brooks, Canton; Michael J. Gallo, Twinsburg, all of Ohio

[73] Assignee: Khyber Technologies Corporation, Fairlawn, Ohio

[21] Appl. No.: 146,713

[22] Filed: Nov. 1, 1993

Related U.S. Application Data

[63] Continuation-in-part of Ser. No. 835,760, Feb. 13, 1992, Pat. No. 5,265,591.

[51] Int. Cl.⁶ .................................................. G06K 7/00
[52] U.S. Cl. .................................. 235/435; 277/237 A
[58] Field of Search ............................ 235/435, 439, 235/475, 482, 483, 485, 479, 480, 441; 369/77.1; 361/737, 739, 736, 684, 741, 748, 753, 756, 760, 796, 802–804, 807, 812, 824; 439/278, 276, 271; 277/237 A; 160/11, 40, 41

[56] References Cited

U.S. PATENT DOCUMENTS

| | | | |
|---|---|---|---|
| 4,829,502 | 5/1989 | Aoyagi et al. | 369/77.1 |
| 5,265,951 | 11/1993 | Kumar | 312/223.2 |

FOREIGN PATENT DOCUMENTS

| | | | |
|---|---|---|---|
| 61-278986 | 12/1986 | Japan | 235/435 |
| 1-13283 | 1/1989 | Japan | 369/77.1 |
| 5-153217 | 6/1993 | Japan | 361/737 |

OTHER PUBLICATIONS

"Dust Seal for Zero–Insertion–Force Connector with Plastic Housing", IBM Technical Disclosure Bulletin vol. 31, No. 6, Nov. 1988, pp. 119–123.

*Primary Examiner*—Donald T. Hajec
*Assistant Examiner*—Michael G. Lee
*Attorney, Agent, or Firm*—Sand & Sebolt

[57] ABSTRACT

An electronic terminal of the type employing a card reading device mounted within the interior thereof accessible through an input port formed in a wall of the terminal. A shield formed of an elastomeric material is mounted adjacent the input port of the card reader to prevent the entrance of debris into the interior of the terminal. The shield provides at least two opposing movable overlapping flaps extending over the card reader input port. The flaps are readily flexible to allow a card to slide therebetween, and automatically flex back to an overlapping closed position when the card is withdrawn. Locator pins and mating holes are provided in said flaps to assure a consistent return to the closed and sealed position. In one embodiment, the shield is made from two half sections which may be either separated or connected via a flexible bridge. In another embodiment, end inserts are provided between said half sections which may also be separate members or attached to said half sections via corresponding flexible bridges.

16 Claims, 6 Drawing Sheets

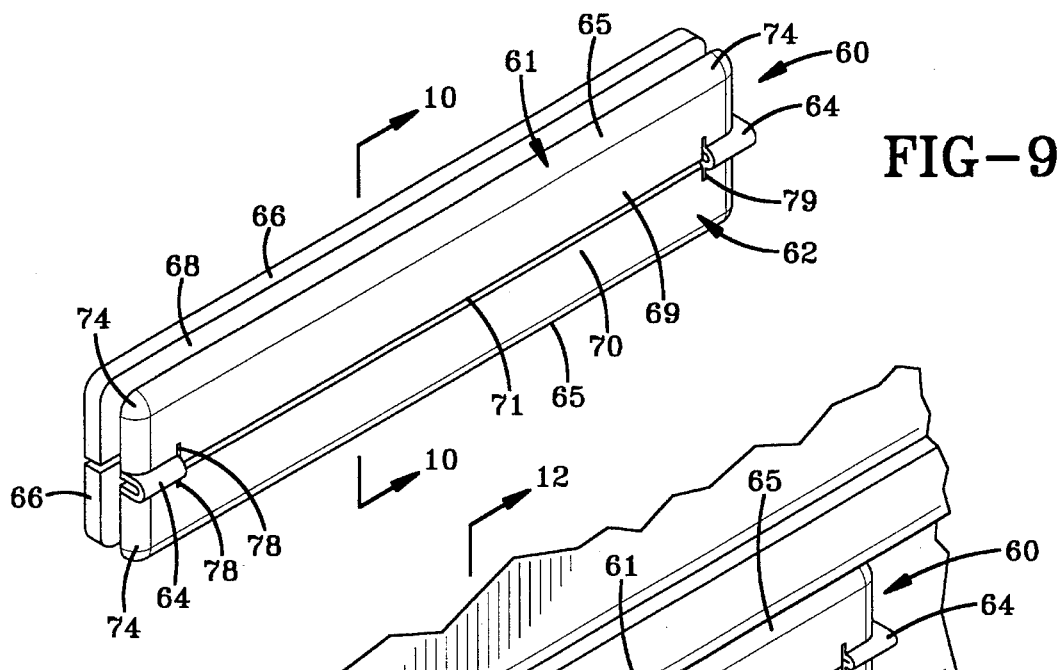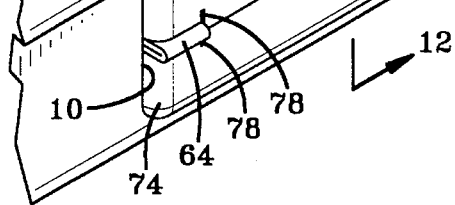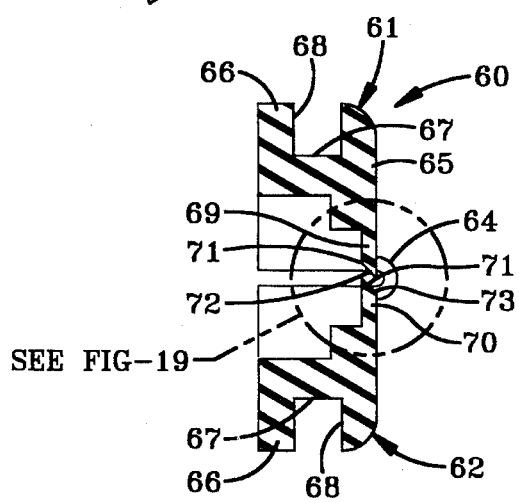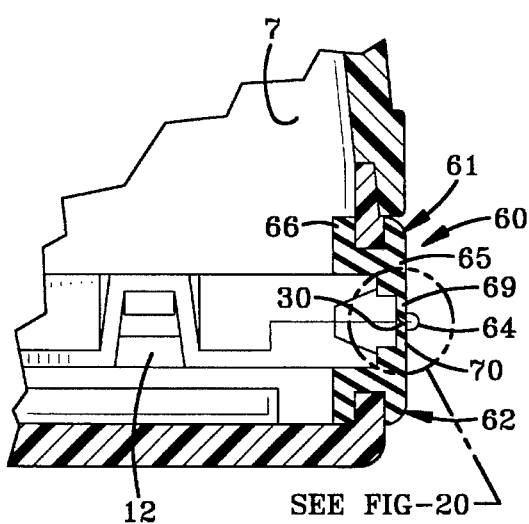

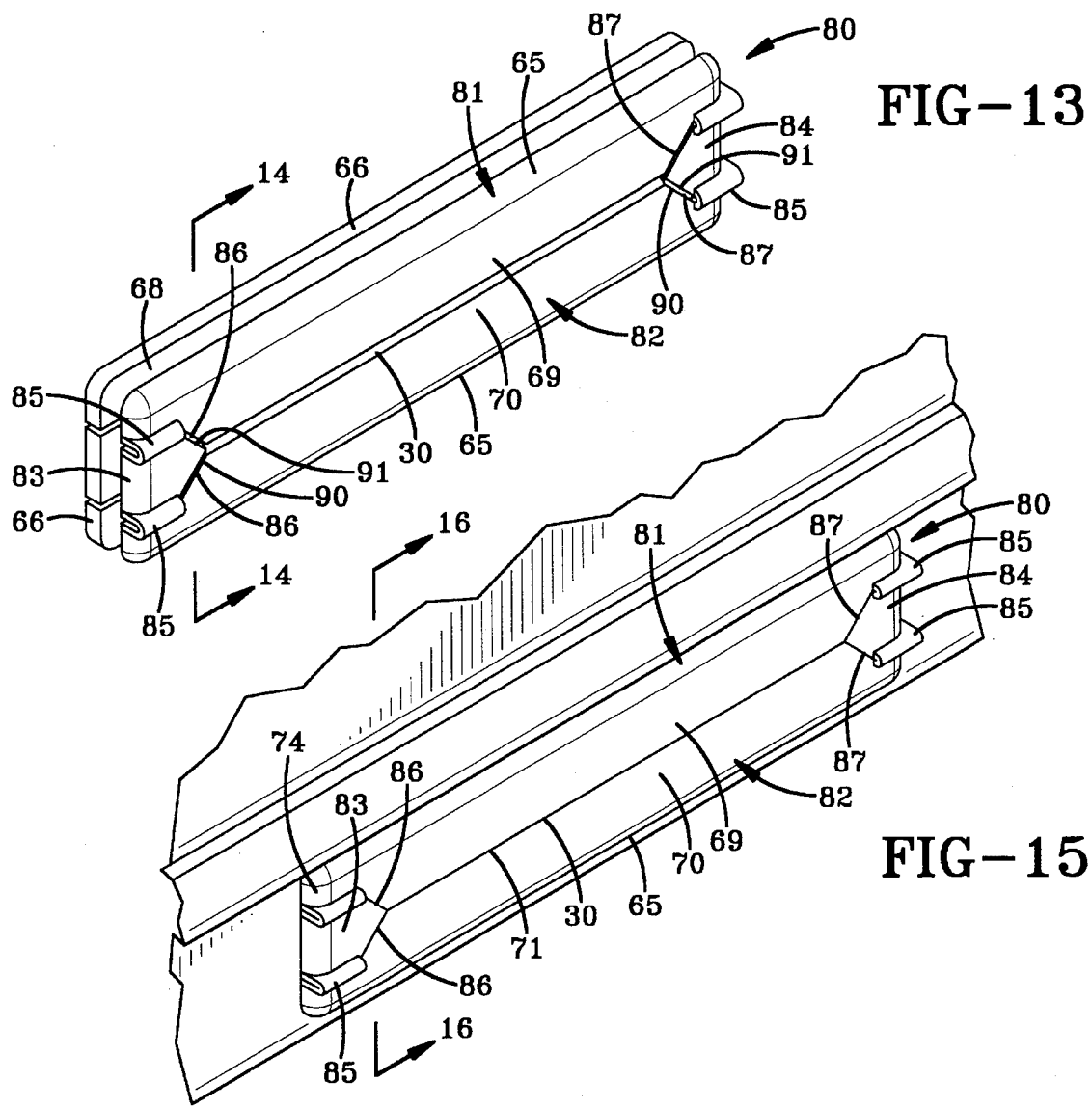
FIG-13
FIG-15
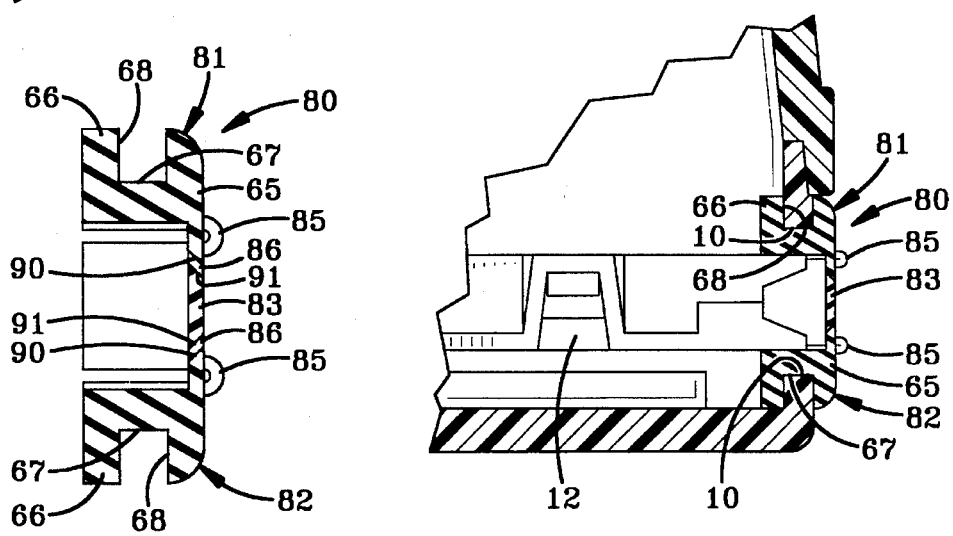
FIG-14
FIG-16

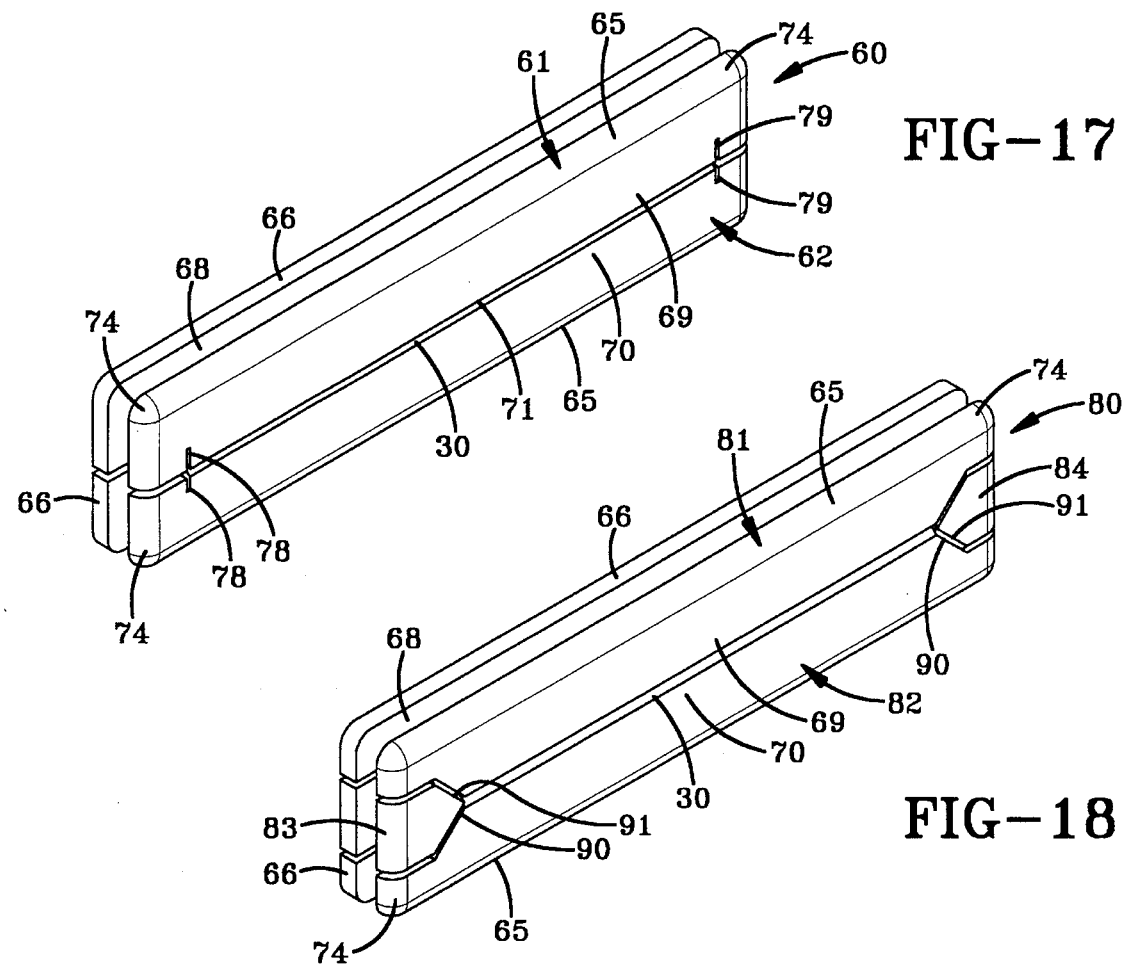
FIG-17
FIG-18
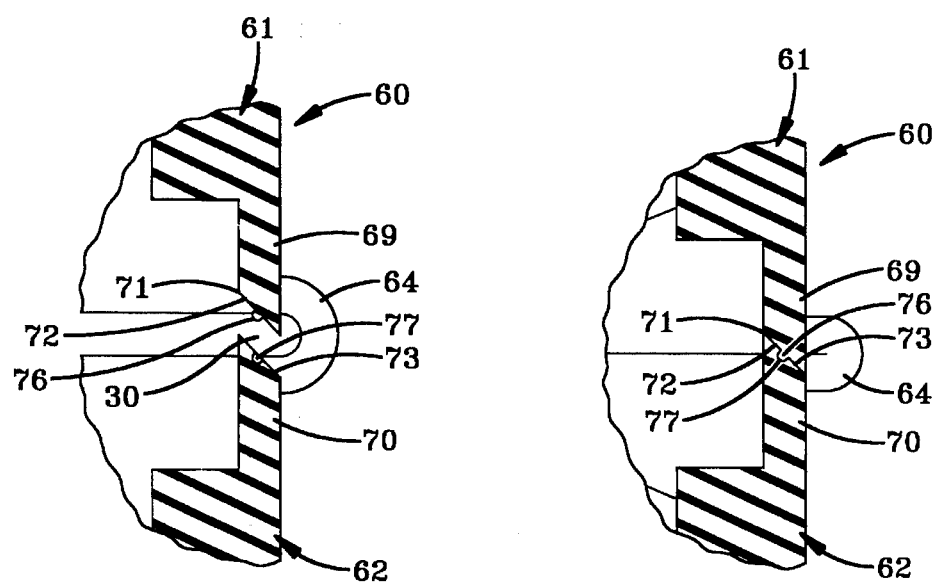
FIG-19
FIG-20

CARD READING TERMINAL HAVING PROTECTIVE SHIELD FOR INPUT PORT THEREOF

CROSS REFERENCE TO RELATED APPLICATION

This application is a continuation-in part of pending application Ser. No. 07/835,760, filed Feb. 13, 1992, now issued U.S. Pat. No. 5,265,591.

BACKGROUND OF THE INVENTION

1. Technical Field

The present invention relates to electronic computing devices. More particularly, the invention relates to electronic computing devices in the form of a card reader which has an input port for insertion of an encoded card therein. Specifically, the invention relates to a flexible shield placed over the card reader input port to prevent dust and debris from entering the input port.

2. Background Information

Terminal devices whose primary or exclusive function is to retrieve information from a portable card are well known in the art and in recent years have become quite sophisticated, including the ability to read a variety of credit cards, processor cards, and memory cards. For example, many cards of this type which are integrated circuit cards commonly referred to in the industry as "smart cards", have a microprocessor chip integrally associated therewith. The card reader directly engages the microprocessor chip on the card and performs the associated functions via the card reader device. Moreover, a variety of cards may be purchased, each having a dedicated function, and in that manner a single machine may have a multiplicity of dedicated functions. Alternately, the card may employ a memory chip, storing product information, inventory, personnel data, etc.

In one example, these machines are employed in mass transit systems where a card is issued to each monthly patron with a chip thereon being preprogrammed with a prepurchased number of trips. As the patron boards the train, the card is inserted into the card reader associated with the electronic computer device and the value of one ride is removed. The card then is returned to the patron for future use. This then not only allows both the mass transit operator and patron to carry little or no money, the mass transit authority is better able to predict the number of patrons riding on a daily basis.

The above referenced card readers and associated cards are set forth in one or more of the following U.S. Pat. Nos. 3,971,916, 4,007,355, 4,092,524, 4,102,493, and the contents thereof are incorporated herein by reference.

One problem associated with such terminals or card reading devices is that the internal electronics remain open to the elements thereby allowing dust or debris to enter the machine through the card input port. Thus, despite the increased popularity of the card reading terminals, no such terminal includes a shield that will provide entry of a programmed card into the card reader, and simultaneously provide a shield against the entry of dust, and debris when the card is not in use.

SUMMARY OF THE INVENTION

Objectives of the present invention include providing a shield to prevent dust and debris from entering the entrance port through which a machine readable card is inserted into a card reading terminal.

Another objective is to provide such a shield which will open automatically to allow the entrance of the card into the card reader port while automatically shielding the input port when the card is removed, as well as when inserted.

A further objective of the present invention is to provide such a shield as set forth above, which may be inexpensively created, and be included in the original manufacture of the computing device or card reading terminal.

A still further objective of the present invention is to provide such a protective shield which can be easily and inexpensively retrofitted to an existing terminal.

Another objective is to provide such a shield that is formed of a flexible elastomeric or rubber material which will open and close repeatedly throughout the life of the card reading machine, and which is unaffected by cyclic stress.

A still further objective of the present invention is to provide such a shield with overlapping flaps.

Yet another objective of the present invention is to provide such a shield which may be manufactured in a number of separate parts or as a single unit.

A still further objective is to provide such a shield which is of a simple construction, which achieves the stated objectives in a simple, effective and inexpensive manner, and which solves problems and satisfies needs existing in the art.

These and other objectives and advantages of the invention are obtained by the improved terminal of the invention, the general nature of which may be stated as a terminal of the type having card reading means incorporated therein accessible through an input port for detecting information stored on a preprogrammed card when the card is inserted through the input port and into communication with the card reading means, wherein the improvement includes shield means mounted on the terminal adjacent the input port having a flexible closure movable between open and closed positions for blocking the entrance of debris through said input port and into the card reading means when in the closed position, and for automatically moving to the open position permitting the passage of a card therethrough when said card is inserted into said input port for communication with said card reading means; said shield means includes a pair of opposing flexible flaps extending over said input port, with one of the pairs of opposing flexible flaps overlapping at least a portion of the second of the pairs of opposing flexible flaps when said shield means is in the closed position.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 9 is a perspective view depicting a fourth embodiment of the protective shield;

FIG. 10 is an enlarged sectional view taken along line 10—10 of FIG. 9;

FIG. 11 is a perspective view of the protective shield of FIG. 9 shown installed on a card reader which is shown in fragmentary;

FIG. 12 is an enlarged fragmentary sectional view taken along line 12—12 of FIG. 11;

FIG. 13 is a perspective view depicting a fifth embodiment of the protective shield;

FIG. 14 is an enlarged sectional view taken along line 14—14 of FIG. 13;

FIG. 15 is a perspective view of the protective shield of FIG. 13 shown installed on a card reader which is shown in fragmentary;

FIG. 16 is an enlarged fragmentary sectional view taken along line 16—16 of FIG. 15;

FIG. 17 is a perspective view depicting an alternative embodiment of the protective shield;

FIG. 18 is a perspective view depicting an alternative embodiment of the protective shield;

FIG. 19 is an enlarged sectional view of the encircled portion of FIG. 10; and

FIG. 20 is an enlarged sectional view of the encircled portion of FIG. 12.

Similar numbers refer to similar parts throughout the drawings.

DESCRIPTION OF THE PREFERRED EMBODIMENT

Figure 4:
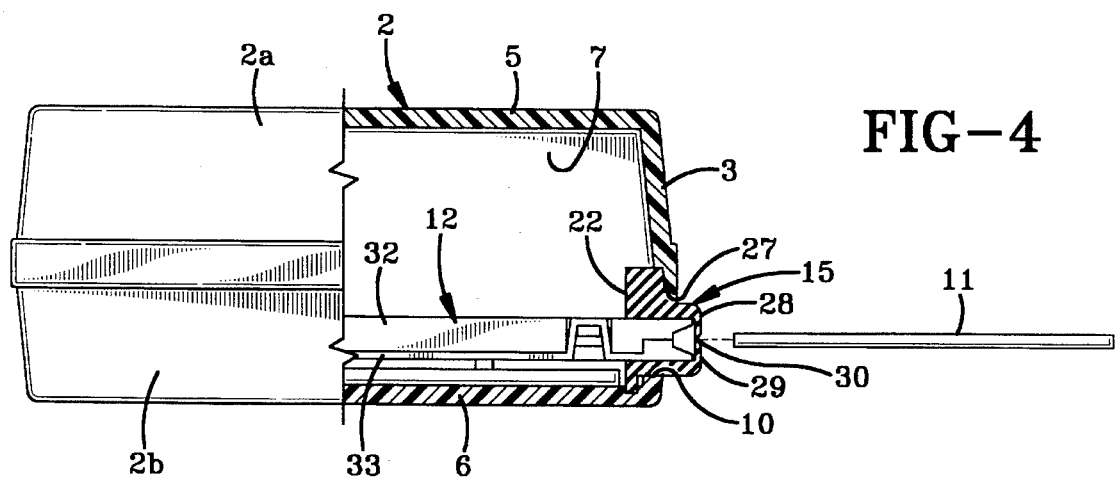
FIG. 4 is a side elevational view, in partial section, of the card reading device of FIGS. 1 and 2 just prior to a card being inserted therein.

The improved card reading terminal of the invention is indicated generally at 1, and includes a housing 2 having spaced parallel sidewalls 3, spaced parallel end walls 4, and spaced parallel top and bottom walls 5 and 6, respectively. Top wall 5 may be provided with a manually actuated keyboard 8 and has an information readout screen 9 in an upper portion thereof. A generally rectangularly shaped card input port 10 is formed in sidewall 3 and is adapted to receive the input of a card reader 12 therein, which will slidably receive an encoded preprogrammed card 11. Terminal 1 will contain card reader 12 within a hollow interior 7 of housing 2 as shown in FIG. 4, and may contain numerous other electronic components and circuitry for carrying out various functions.

Figure 1:
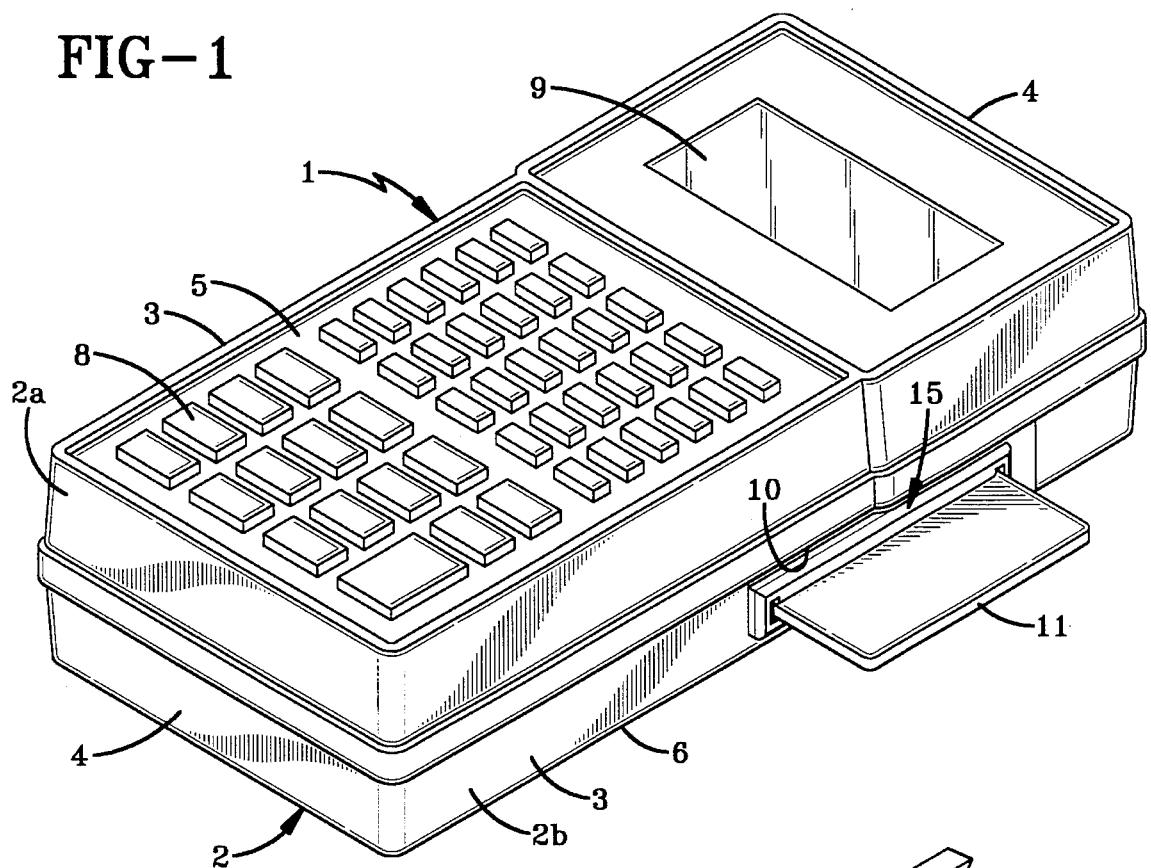
FIG. 1 is a perspective view of the present invention in operative association with an electronic card reader shown with a machine readable card inserted partially therein.
Figure 2:
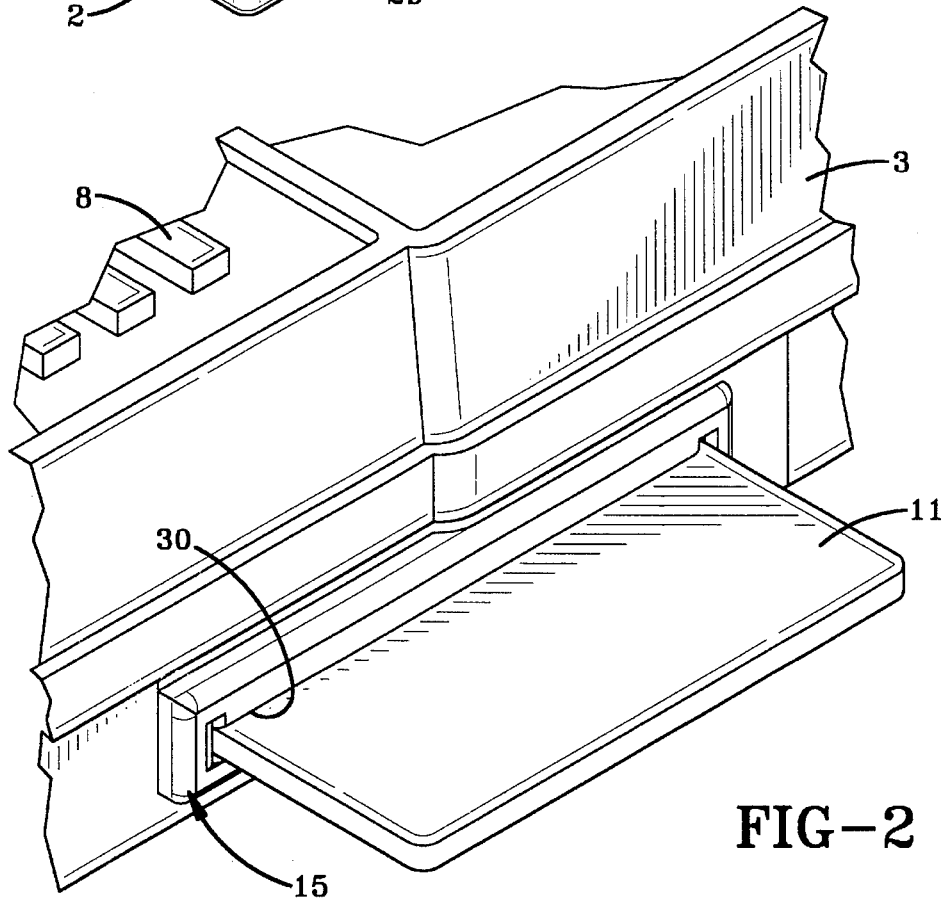
FIG. 2 is an enlarged fragmentary view of the protective shield of the invention as shown in FIG. 1.

Terminal 1 may be of various types of electronic processing equipment capable of retrieving information from information carrying card 11. Shown in FIG. 1 is a terminal identified as Model 710 manufactured by Telxon Corporation of Akron, Ohio which has been modified by the addition of a card reader 12. However, it is apparent that other types of electronic card readable machines could utilize the protective shield of the present invention. Terminal 1 also may vary greatly in both use, size and configuration ranging from the hand held unit shown in FIG. 1 to large stationary sales terminals. Also, the electronics contained therein may also be varied without departing from the concept of the invention.

Card 11 also may have various forms and provide various functions, such as credit cards, identification cards, memory cards, etc. Any type of card having readable information programmed thereon or incorporated therein by means of an electronic circuit chip or the like, may be utilized with terminal 1 without affecting the concept of the invention.

Card reader 12 also may be of various types and styles so long as it is used in association with input port 10 so that information carrying card 11, when inserted through the input port, will be received in card reader 12 as shown particularly in FIGS. 4, 5, 6 and 8, whereby the electronic circuitry incorporated therewith (not shown), which also may be one of a number of readily well known reading circuits, reads the information stored on card 11. Examples of such card readers and cards are disclosed in one or more of the following patents namely, U.S. Pat. Nos. 3,971,916, 4,007,355, 4,092,524 and 4,102,493.

Figure 3:
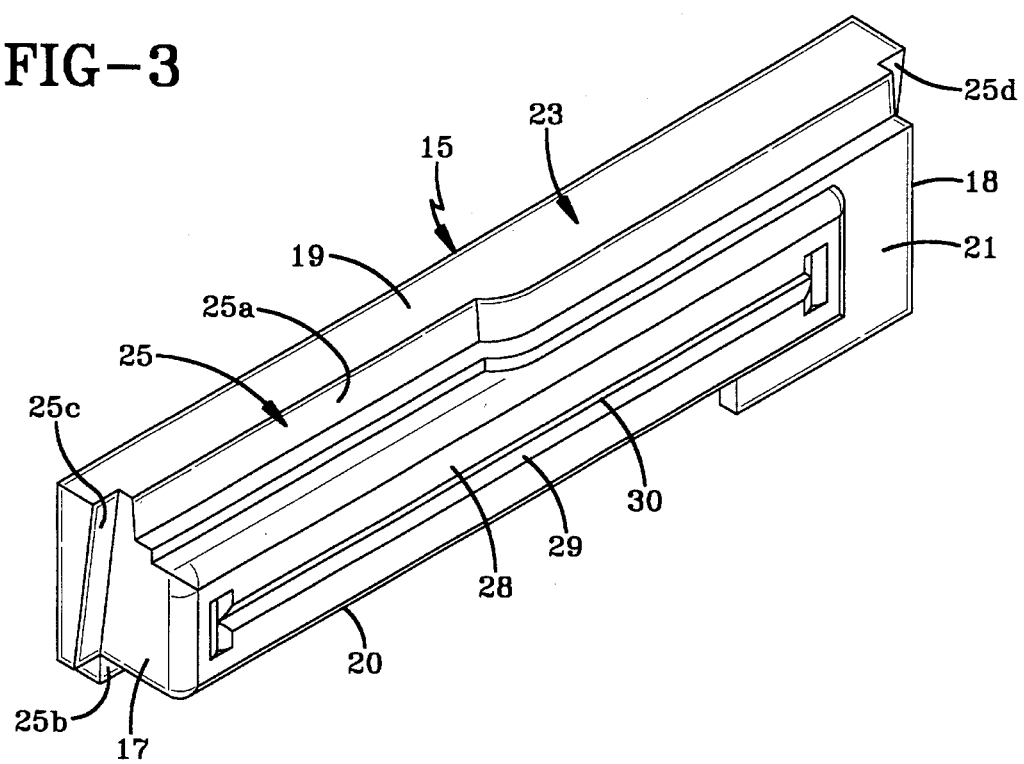
FIG. 3 is an enlarged perspective view of the protective shield removed from the card reader of FIGS. 1 and 2.
Figure 5:
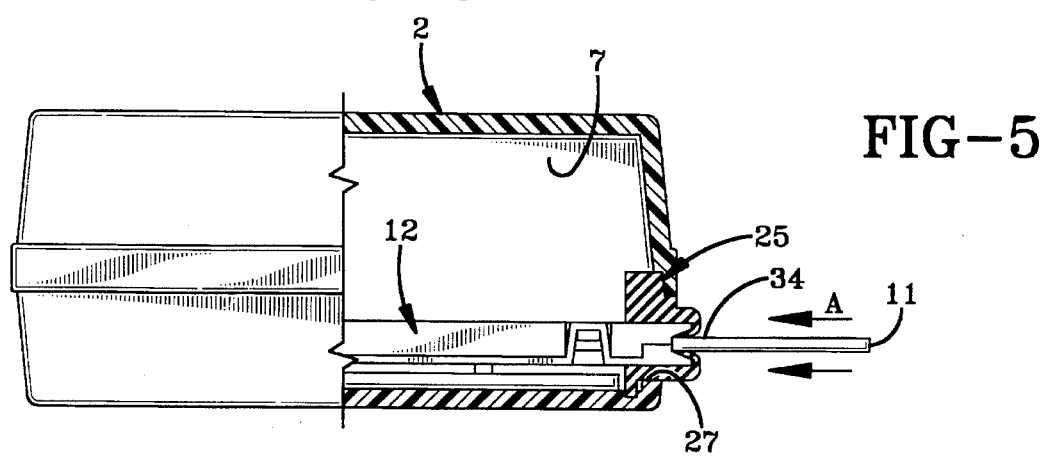
FIG. 5 is a view similar to that of FIG. 4, depicting the card in operative association in the electronic card reader.

In accordance with the main feature of the invention, an elastomeric shield indicated generally at 15, is mounted in inlet port 10 to prevent the ingress of dust, dirt and other debris into interior 7 of terminal 1 and in particular, into card reader 12. Shield 15 is an integrally molded one-piece member (FIG. 3) having a main relatively rigid body 23 provided with a pair of parallel ends 17 and 18, parallel top and bottom portions 19 and 20, a front face 21 and a rear face 22. A peripheral shoulder indicated generally at 25, defined by top and bottom portions 25a and 25b and by side portions 25c and 25d, are formed in body 23 of shield 15 for engagement with the peripheral edges 27 of sidewall 3, which edges define input port 10 (FIGS. 4 and 5). Shoulder 25 retains shield 15 within input port 10 without additional fastening means when half-sections 2a and 2b of housing 2 are joined together and trap shield 15 within input port 10. If desired, a bonding adhesive or attachment screws could be used to mount shield 15 within input port 10. Also, it is readily apparent that shoulder 25 of seal 15 may vary depending upon the contour and configuration of the edges of the housing wall which defines input port 10.

In further accordance with the invention, a pair of elongated flexible flaps 28 and 29 are formed on body 23 and form an elongated slit 30 therebetween which extends generally throughout the elongated length of the input port. Flexible flaps 28 and 29 preferably contact each other when in the closed position of FIG. 4 but will flex readily inwardly to an open position when card 11 is inserted through inlet port 10 as shown by arrows A in FIG. 5 to permit the entry of the card into card reader 12 for subsequent reading of the information encoded thereon. The flexible flaps maintain contact with card 11 when inserted therein to further ensure that no debris will enter into the card reader or interior of housing 2. Also, the flexible flaps will tend to slide over the top and bottom surfaces of card 11 wiping dust and other particles therefrom prior to the card entering into card reader 12. When the card is removed, the natural resiliency of the elastomeric material which forms flaps 28 and 29 return the flaps to their closed position as shown in FIG. 4.

Card reader 12 may be of the type consisting of a pair of plastic housing units 32 and 33 with the outer edges 34 thereof tapering inwardly to ease the acceptance of card 11 when inserted through inlet port 10. The remaining characteristics and feature of card reader 12 and card 11 are well known in the art, and therefore are not described in further detail.

Figure 6:
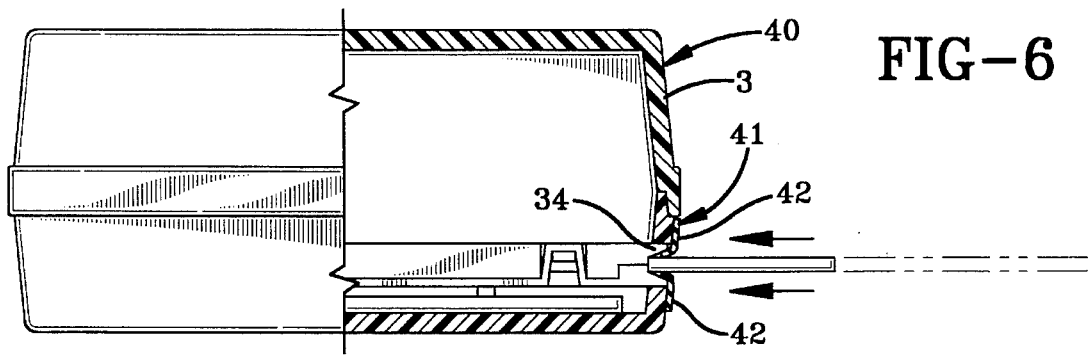
FIG. 6 is a view similar to FIGS. 4 and 5, depicting a second embodiment of the protective shield of the present invention.

A second embodiment of the improved terminal is indicated generally at 40, and is shown particularly in FIG. 6. In embodiment 40, a one-piece elastomeric shield 41 is provided to provide a simple retrofit member to be employed when tapered outer edges 34 of card reader 12 are flush with or positioned behind the outer surface of wall 3. As shown in FIG. 6, shield 41 is substantially planar in cross section having mounting tabs 42 which lie generally in the same plane as flexible flaps 28 and 29 thereof when the flaps are in the closed position. Mounting tabs 42 extend outwardly and encircle the flexible flaps and may be affixed to the outer surface of housing wall 3 by any convenient mounting means such as an adhesive, mounting brackets, or other attachment means. In this manner, existing terminals may be retrofitted with shield 41 to block the entry of dust and debris into card reader 12 through input port 10.

Figure 7:
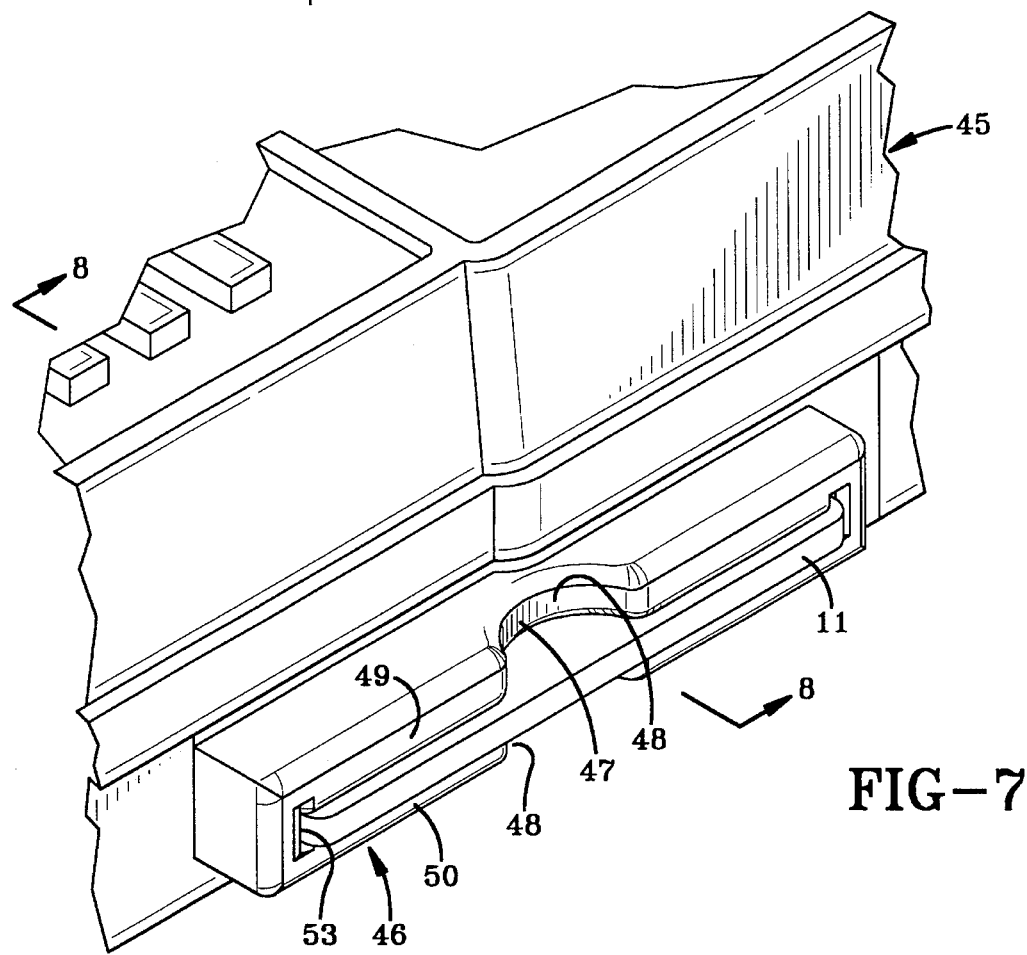
FIG. 7 is an enlarged fragmentary perspective view similar to FIG. 2, depicting a third embodiment of the protective shield of the present invention.
Figure 8:
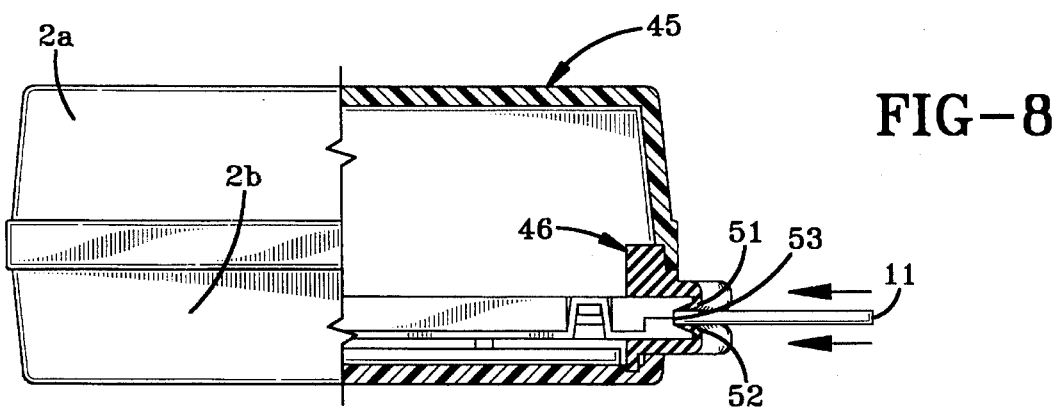
FIG. 8 is an elevational view similar to that of FIGS. 4–6, in partial section taken on line 8—8, FIG. 7, depicting the card in operative association with the internal electronic card reader.

A third embodiment of the improved terminal is shown in FIGS. 7 and 8 and is indicated generally at 45. Embodiment 45 usually will be of a larger nature wherein the full length of card 11 is inserted through the input port into card reader 12, for reading the encoded information therefrom. This requires some modification to the previously described shields 15 and 41 in order to enable removal of card 11 once inserted into the terminal, as only a small portion of the card remains visible and extending outside of the terminal. Therefore, a shield indicated generally at 46, is provided which will provide a central area 47 where card 11 may be readily grasped. A pair of opposed arcuate recesses 48 are formed in upper and lower portions 49 and 50 of the relatively rigid portion of the elastomeric body of shield 46 allowing an area where a nearly fully inserted card 11 can be grasped and retrieved from within card reader 12. Flexible flaps 51 and 52 extend completely throughout the length of shield 46 and follow the curvature of arcuate recesses 48 so as to provide a continuous seal for a slit 53 formed between flaps 51 and 52 through which card 11 is inserted to prevent the entrance of any debris through the slit and into the interior of the terminal housing.

The remaining embodiments provide added protection against the ingress of dust and debris into interior 7 of terminal 1, and in particular, into card reader 12.

A fourth embodiment of the improved shield is shown particularly in FIG. 9–12, and is indicated generally at 60. Shield 60 is a one-piece elastomeric member defined by a pair of elongated half sections 61 and 62, with each half section 61 and 62 including a pair of side flanges 74. The ends of flanges 74 are joined via a pair of corresponding flexible bridges 64. Each half section 61 and 62 includes a respective substantially planar outer flange 65, an inner flange 66, and a connecting ridge 67 which combine to form a mounting trough 68 as best seen in FIG. 10. Each half section 61 and 62 also includes one of a pair of flexible flaps 69 and 70 respectively, which terminate at side flanges 74.

In accordance with one of the main feature of the present invention, flap 69 is coplanar with the outer surface of outer flange 65 and includes a free edge 71 having an inclined surface 72 thereon (FIG. 10). Similarly, flap 70 is coplanar with the outer surface of outer flange 65 and includes a free edge 71 having an inclined surface 73 complementarily shaped with inclined surface 72 such that edges 71 of flaps 69 and 70 overlap via the complementary relationship of inclined surfaces 72 and 73, when installed in card reader 12 as shown in FIGS. 11 and 12. The overlapping arrangement of flaps 69 and 70 thus entirely seals elongated entrance slit 30.

Each flap 69 and 70 terminates at one end at respective end slots 78, and at a second end at respective end slots 79. End slots 78 and 79 are substantially normal to entrance slot 30 and edges 71 to provide flexibility for flaps 69 and 70. Referring to FIGS. 19 and 20, flap 69 may also include a pair of locator pins 76 (one shown), and flap 70 includes a pair of locator holes 77 (one shown). Pins 76 and holes 77 mate when flaps 69 and 70 are in the closed position to assure that they remain in overlapping engagement.

Turning to the assembly of shield 60 into card reader 12, the edges of input port 10 are inserted into mounting trough 68 with outer flange 65 and inner flange 66 retaining shield 60 in position. Before shield 60 is installed, it is initially in the relaxed position shown in FIG. 10 where half sections 61 and 62 are spaced apart such that edges 71 are not in overlapping engagement. However, when installed in a card reader 12 as shown specifically in FIGS. 11 and 12, half sections 61 and 62 will be compressed such that edges 71 are brought into overlapping contact. In this manner bridges 64 will be moved from the relaxed position of FIG. 10 to the compressed position shown in FIG. 12 which in turn will move inclined surfaces 72 and 73 into overlapping engagement.

When a card is to be inserted into card reader 12, flaps 69 and 70 will open substantially the same as in the above embodiments, and when the card is removed therefrom, flaps 69 and 70 will move to the closed position shown in FIG. 12 and locator pins 76 and locator holes 77 will operatively engage to assure that flaps 69 and 70 remain in the above described overlapping arrangement.

A fifth embodiment of the improved shield is shown particularly in FIG. 13–16, and is indicated generally at 80. Shield 80 is a one-piece elastomeric member defined by a pair of elongated half sections 81 and 82, and a pair of end inserts 83 and 84. Elongated half sections 81 and 82 are each joined to end inserts via flexible bridges 85. Similar to the fourth embodiment, and as shown in FIG. 13, each half section 81 and 82 includes a respective substantially planar outer flange 65, an inner flange 66, and a connecting ridge 67 which combine to from a mounting trough 68 as best seen in FIG. 14. Each half section 81 and 82 also includes one of a pair of flexible flaps 69 and 70 respectively, having a design similar to that described with respect to the fourth embodiment, and also terminates at side flanges 74.

In accordance with one of the main features of the invention of the fifth embodiment, flaps 69 and 70 terminate on a first side at a pair of end slots 86 and on a second side at a second pair of end slots 87. Each end slot 86 is formed with an inclined edge 90 (FIG. 14) which contacts an inclined edge 91 of an end insert 83. Each end slot 87 is formed with an inclined edge 90 which contacts a corresponding inclined edge 91 of an end insert 84. Preferably, inclined edges 90 and 91 are complementarily shaped such that they operatively engage to form an overlap joint similar to that created between flaps 69 and 70. Moreover, end slots 86 and 87 are angled away from entrance slit 30 such that an obtuse angle is formed between entrance slit 30 and end slots 86 and 87 respectively. The angled relationship between entrance slit 30 and end slots 86 and 87 provides increased flexibility in flaps 69 and 70 to permit the passage of a larger card therethrough.

As is apparent from reviewing the fifth embodiment, the entire opening 10 of card reader 12 is sealed against weather and debris as a result of the overlapping seal between flaps 69 and 70, and end inserts 83 and 84. Installation and operation of the fifth embodiment is similar to that of the fourth embodiment. Moreover, locator pins and corresponding locator holes may be utilized in the fifth embodiment as in the fourth embodiment without departing from the spirit of the present invention.

Bridges 64 and 85 of embodiments four and five respectively, permit shield 60 or 80 to be manufactured as a single part or one-piece member to ease manufacturing and assembly costs. However, bridges 64 and 85 could be removed without departing from the spirit of the present invention as shown specifically in FIGS. 17 and 18. If shield 60 or 80 is manufactured without respective bridges 64 and 85, the shield will simply be an assembly of components, rather than a single molded part.

The fourth and fifth embodiments of the present invention thus provide overlapping flexible flaps which effectively seal the entrance slit against the ingress of dirt and debris. This overlapping engagement is created via the complementarily shaped edges of the opposing flexible flaps. Moreover, locator pins, and corresponding locator holes, are provided to assure that when the opposing flexible flaps return to the closed position. They consistently overlap to assure that entrance slit 30 is sealed.

The preferred material from which shields 15, 41 and 46 may be manufactured or molded is ethylene polypropylene (EPDM). However, it is readily apparent to one skilled in the art that any suitable material could be employed so long as the flap portions thereof have sufficient flexibility to move readily from a closed position to an open position to allow the entrance of a card when inserted therethrough, and which will return to the closed position automatically upon the removal of the card from the slit formed therebetween.

Accordingly, the improved terminal of the invention and in particular the flexible shield thereof is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved card reading terminal and the protective shield thereof is constructed and used, the characteristics of the construction, and the advantageous, new and useful results obtained; the new and useful structures, devices, elements, arrangements, parts and combinations, are set forth in the appended claims.

We claim:

1. An improved terminal of the type having card reading means incorporated therein accessible through an input port for detecting information stored on a preprogrammed card when said card is inserted through said input port and into communication with the card reading means, said improvement including:

shield means mounted on the terminal adjacent the input port having a resilient elastomeric flexible closure movable between open and closed positions for blocking the entrance of debris through said input port and into the card reading means when in the closed position, and for resiliently moving to the open position permitting the passage of a card therethrough when said card is inserted into said input port for communication with said card reading means;

said flexible closure includes a pair of opposing flexible flaps having an outermost free edge, said flaps extending over said input port, with one of the pair of opposing flaps overlapping and abutting at least a portion of the second of the pair of opposing flaps at said outermost edges when said flexible closure is in the closed position;

in which the outmost free edges of the flexible flaps are formed with respective complementary shaped inclined surfaces which surfaces abut when said flaps overlap, and in which slots are formed in the shield means at ends of the flexible flaps.

2. The terminal defined in claim 1 in which one of the pair of opposing flexible flaps has a free edge complementarily shaped to a free edge of the second of the pair of opposing flexible flaps, such that when in the closed position, said pair of opposing flaps seal an entrance slit therebetween.

3. The terminal defined in claim 2 in which the flaps move apart to increase the size of the slit therebetween when a card is inserted into the input port and flex back into the closed position when the card is removed therefrom.

4. The terminal defined in claim 3 in which the terminal includes a housing formed by a pair of separable half-sections; in which the input port is defined by a peripheral edge, portions of which are formed on each of the half-sections of the housing; and in which said peripheral edge portions of the half-sections engage the shield means to secure the shield means at the input port when the half-sections are joined together to form the housing.

5. An improved terminal of the type having card reading means incorporated therein accessible through an input port for detecting information stored on a preprogrammed card when said card is inserted through said input port and into communication with the card reading means, said improvement including:

shield means mounted on the terminal adjacent the input port having a flexible closure movable between open and closed positions for blocking the entrance of debris through said input port and into the card reading means when in the closed position, and for automatically moving to the open position permitting the passage of a card therethrough when said card is inserted into said input port for communication with said card reading means;

said flexible closure includes a pair of opposing flexible flaps extending over said input port, with one of the pair of opposing flaps overlapping at least a portion of the second of the pair of opposing flaps when said flexible closure is in the closed position;

in which one of the pair of opposing flexible flaps has an inclined free edge complementarily shaped to an inclined free edge of the second of the pair of opposing flexible flaps, such that when in the closed position, said pair of opposing flaps seal an entrance slit therebetween; and in which one of the opposing flexible flaps includes at least one locator pin which will matingly engage a locator hole carried by the second flexible flap.

6. The terminal defined in claim 5 in which the locator pin is formed integrally on the free edge of one opposing flexible flap, and the locator hole is formed in the free edge of the second flexible flap.

7. The terminal defined in claim 6 in which the shield means includes a pair of half sections, with one opposing flexible flap being included in each half section.

8. The terminal defined in claim 7 in which each of the pair of opposing flexible flaps is integrally molded with a corresponding half section.

9. The terminal defined in claim 7 in which the pair of half sections are attached to each other via at least one flexible bridge such that the pair of half sections form a one-piece shield.

10. The terminal defined in claim 9 in which the input port has a generally elongated rectangular configuration with the entrance slit formed between the pair of flaps extending generally throughout the elongated length of said input port with each half-section including a pair of side flanges extending outwardly past said input port, said side flanges being connected by the corresponding flexible bridges.

11. The terminal defined in claim 5 in which the end slots are substantially normal to the entrance slit.

12. The terminal defined in claim 5 in which the end slots form an obtuse angle with the entrance slit.

13. The terminal defined in claim 5 in which each end slot is defined by a pair of opposing edges which overlap when said flexible flaps are in the closed position.

14. The terminal defined in claim 5 in which a pair of end inserts are positioned between said side flanges of said half sections.

15. The terminal defined in claim 14 in which the one edge of said end slots is formed by an edge of a corresponding end insert.

16. The terminal as defined in claim 14 in which said pair of half sections and said pair of end inserts are connected via a plurality of flexible bridges.

* * * * *